United States Patent [19]

Lundquist

[11] 4,062,123
[45] Dec. 13, 1977

[54] ADJUSTABLE ROUTING TEMPLATE

[76] Inventor: Ray Arnold Lundquist, 2571 - 24th Ave. North, St. Petersburg, Fla. 33713

[21] Appl. No.: 721,033

[22] Filed: Sept. 7, 1976

[51] Int. Cl.$^2$ ............................................... B27C 5/00
[52] U.S. Cl. .................................. 33/174 G; 33/103; 144/144.5 R
[58] Field of Search .................. 33/174 G, 185 R, 97, 33/98, 102, 103; 144/144 R, 144.5 R

[56] References Cited

U.S. PATENT DOCUMENTS

| 1,661,096 | 2/1928 | Rowe | 33/98 |
|---|---|---|---|
| 2,652,866 | 9/1953 | Drain | 144/144.5 |
| 3,199,556 | 8/1965 | Wing | 144/144.5 |
| 3,875,670 | 4/1975 | Hudgins | 33/174 G |
| 3,910,327 | 10/1975 | Heckenlaible | 144/144 R |
| 3,939,564 | 2/1976 | Slawinski | 33/103 |
| 3,985,168 | 10/1976 | Lundquist | 33/174 G |

Primary Examiner—Richard E. Aegerter
Assistant Examiner—Richard R. Stearns
Attorney, Agent, or Firm—Marden S. Gordon

[57] ABSTRACT

An adjustable routing template intended for use with a routing tool, such as a powered router having a router bit and a guide or reference spindle or bushing, in a manner allowing a craftsman to rout a variety of ornamental designs consisting of grooves and recesses on work pieces such as custom cabinets, doors and the like, the template consisting of a set of bar members or leg members which are identical to each other except some may be longer than others, with the bar members being slidingly interconnected by a plurality of identically configured adjustable connecting links and selectable wedge shaped angle block members to define an open frame type configuration having a flat continuous co-planar bottom surface to lie parallel to and flatly on a work piece to be routed in a manner to provide rigid guide edges in adjustable spaced relationship to the work piece for guiding the routing tool thereover. The number of interconnected bar members may be selectably increased to provide for the routing of a variety of ornamental designs on the work piece.

8 Claims, 11 Drawing Figures

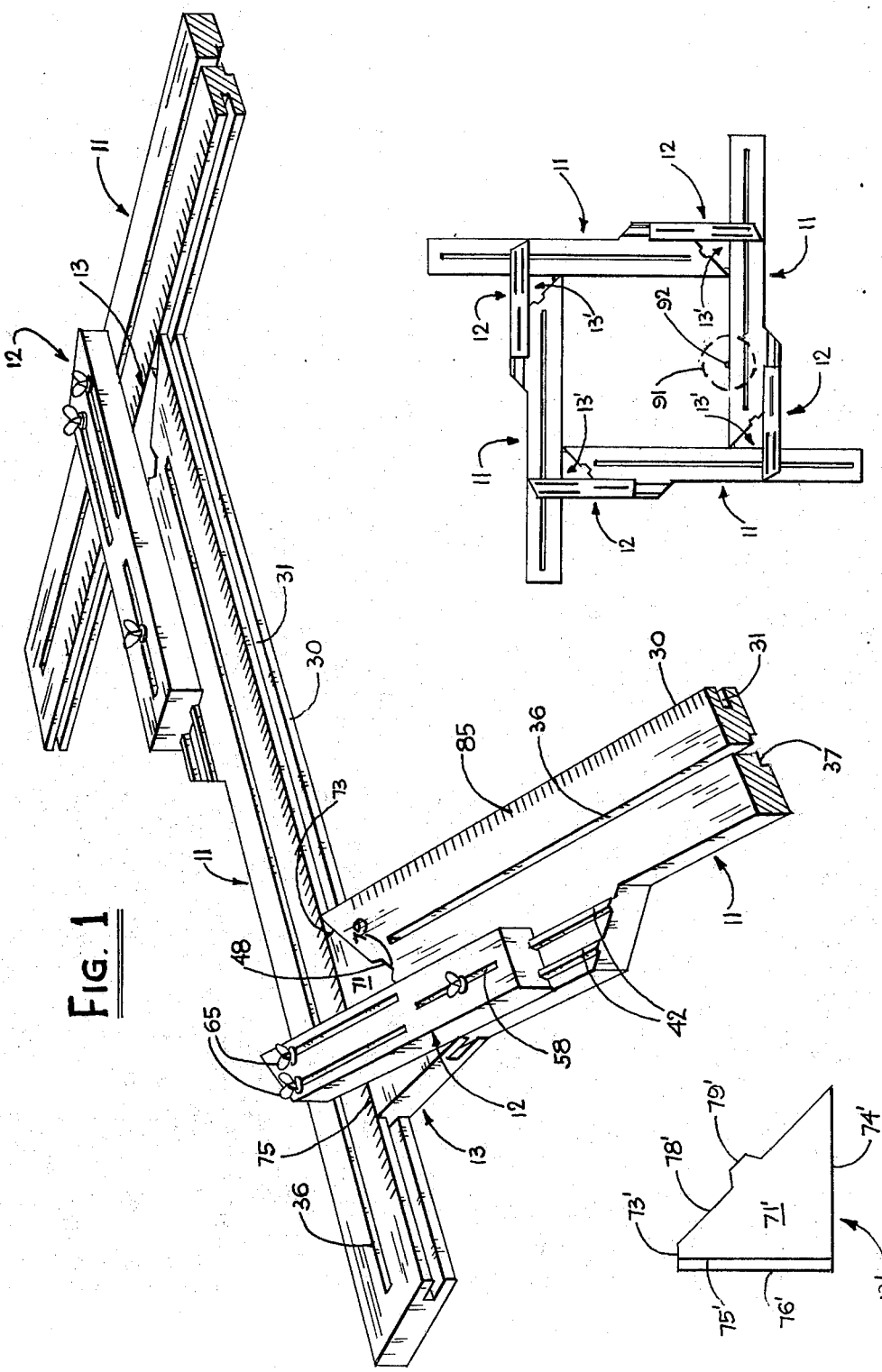

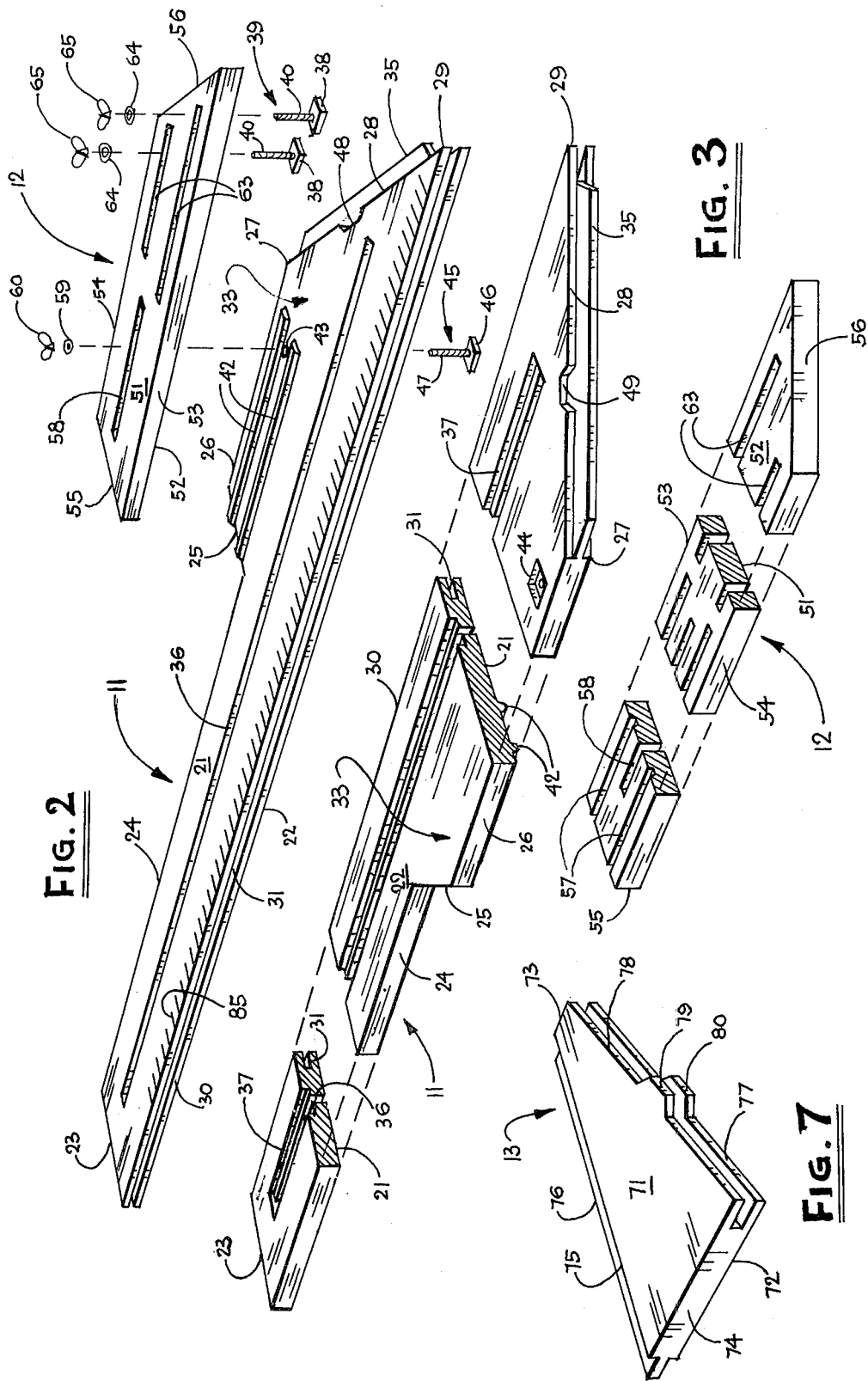

ADJUSTABLE ROUTING TEMPLATE

BACKGROUND OF THE INVENTION

1. Field of the Invention

This invention relates generally to tools and guide devices therefor, and more particularly to a novel infinitely adjustable routing template to be placed over a work piece and providing guiding edges for a router to cut ornamental grooves, recesses, steps, ledges and the like in the work piece, such as in a cabinet door.

2. Description of the Prior Art

The use of powered routers in custom cabinet work for the cutting of ornamental grooves, recesses, steps, ledges and the like in a decorative manner to provide a design on a work piece, such as a cabinet door and the like, has long been known in the art of woodworking. However, while such routers have great flexibility, a craftsman often experiences difficulty in maintaining the routing bit of the powered router in a pre-determined position on the work piece as it is passed along the work being routed. Accordingly, the need developed to provide for guide means for use with powered routers for the accurate guiding of the router over the work piece being routed.

Accordingly, guide devices were developed in the prior art for use with powered routers to guide the same along and over a work piece. However, such prior art guide devices have been of a rather complicated and fragile structure requiring special skills and knowledge as to the handling and care thereof. Examples of such prior art devices are found in U.S. Pat. Nos. 3,540,130; 3,199,556; and 2,652,866.

A disadvantage of such prior art structures is that they require the use of a specific special template for each design being routed, or alternatively, are manufactured of a multiplicity of different interconnected components requiring great care in the assembly and adjustment thereof to assure accurate alignment of the various components.

A further disadvantage of such prior art templates is that while they are adjustable they do not lay flat on the work piece and thus require special care in the use thereof as portions of the template tend to flex during use of the template providing for uneven depth of the recess or groove being routed, this adversely affecting the quality of the craftsmanship performed on the work piece.

Still a further disadvantage of such prior art templates is that guide members must be utilized therewith in order to provide for clearance of the router guide bushing around adjusting brackets utilized to secure the various components of the template together, as otherwise such adjusting brackets would interfere with the free movement of the router and cause distortions in the ornamental design being routed into the work piece.

Prior art devices thus suffer many problems and difficulties in attempting to provide a suitable template for guide of a powered router and that while such prior devices have somewhat improved the functionality of a router being utilized for the routing of an ornamental design on a cabinet door, they have failed to provide a suitable completely adjustable and completely dependable routing template requiring no guide members if none are desired, one which is easy to use and dependable in operation, one which is fully adjustable to provide for a wide variety of designs, and one which is sturdy and will not flex or damage the work piece or the resultant groove or recess being routed.

SUMMARY OF THE INVENTION

The present invention remedies and overcomes all of the foregoing deficiencies and disadvantages of presently available routing templates by providing a novel fully adjustable routing template for use with any manufacturers make of router to rapidly rout an ornamental design in a flat work piece, such as a cabinet door, with the template adjusting rapidly and accurately to fit any size configuration in a manner providing rapid engagement of the template in an overlying position on the work piece in a secure and non-flexing manner to provide accurate guidance of the router thereover in an efficient, rapid and time saving manner.

The present invention provides a novel infinitely adjustable routing template which may be readily securely engaged with flat work pieces of various sizes for the purpose of routing various ornamental designs therein.

Further, the present invention provides an adjustable routing template eliminating any need of manufacturing custom templates corresponding to the size and configuration of a work piece to be routed, thus providing a great time and cost savings.

It is a feature of the present invention to provide a routing template which provides for the entire routing operation of a work piece without the need for resetting or readjusting any parts of the template during the performance of the routing operation.

A further feature of the present invention provides a routing template that does not leave undesirable marks on the work piece during the use thereof.

Yet still a further feature of the present invention provides a routing template which is fully adjustable both in physical size and physical configuration to provide a wide variety of guide surfaces for use with a router.

Still a further feature of the present invention provides an adjustable routing template which lays completely flat on the work piece being routed, thus eliminating any possibility of the deflection of the components of the templates during the routing operation to thus assure the uniformity of the depth of the groove being routed throughout all portions of the work piece during the performance of the routing operation.

Still a further feature of the present invention provides an infinitely adjustable routing template which is easy to use while being reliable and efficient in operation.

Yet still a further feature of the present invention provides an adjustable routing template which is of a rugged and durable design and construction and which, therefore, may be guaranteed by the manufacturer to provide many years of intended usage.

Yet still a further feature of the present invention provides an adjustable routing template which is relatively simple and inexpensive to manufacture, which is quick and easy to assemble and rapidly set prior to the operation and use thereof, and which, therefore, may be readily manufactured at a relatively low cost by readily available manufacturing methods such that it can be retailed at a sufficiently low price to encourage widespread use and purchase thereof.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a top perspective view of a portion of the adjustable routing template of the present invention;

FIG. 2 is a top perspective view of an exemplatory bar or leg member of the template illustrated in an exploded manner;

FIG. 3 is a bottom perspective view of the bar or leg member of FIG. 2 illustrated in an exploded manner;

FIG. 4 is a top plan view of a 45° angle block;

FIG. 7 is a top perspective view representing any of the angle blocks of FIGS. 4, 5 or 6 illustrating the details thereof;

FIG. 8 is a top plan view of the bar members defining a rectangular or square template;

DESCRIPTION OF THE PREFERRED EMBODIMENT

Figure 6:
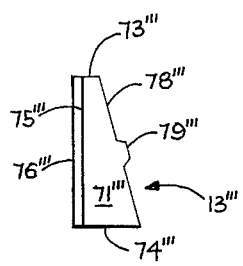
FIG. 6 is a top plan view of a 15° angle block.

Referring now to the drawings in detail and in particular to FIGS. 1 to 3 inclusive, there is illustrated the essential components of the adjustable routing template constructed in accordance with the principals of the present invention and which is comprised of a plurality of identically constructed elongated bar or leg members 11, a plurality of identically constructed elongated connecting link members 12, and a plurality of identically configured wedge shaped angle block members 13. It is to be understood that each of the bar members 11 may be of differing lengths which is determined during the manufacture thereof, with it being further understood that while only up to eight bar members have been illustrated in the drawings that it is envisioned that the principals of the present invention are applicable to a template having any number of side forming bar members.

In addition, in that each of the bar members 11 and connecting link members 12 are identically constructed to each other, and to avoid needless repetition of descriptive material, the following description pertains specifically to a single one of the bar members and connecting links as being typical of the construction of each of the remaining ones thereof.

The bar or leg member 11 may be manufactured out of flat elongated generally rectangularly configured stock material such as wood, metal, or any other suitable satisfactory material and consists of a flat horizontal top surface 21, a flat horizontal bottom surface 22, a flat foot end 23, a flat outside edge 24 extending from foot end 23 up to angled shoulder outer edge 25 which projects outwardly and upwardly therefrom terminating in flat straight outside edge 26 which terminates at junction 27 with angled front end 28 which extends inwardly and forwardly therefrom terminating at apex junction 29, and a flat straight inside edge 30 extending completely between foot end 23 and apex junction 29 and provided with a channel shaped groove 31 extending along the complete length thereof. The portion of the bar member between shoulder 25 and front end 28 will be referred to as the enlarged head end portion 33 for later reference.

A flat rectangularly elongated tongue 35 extends outwardly from front end 28 and is of a size and configuration to be slidably received in channel 31 of an associated bar member 11. Disposed centrally of bar member 11 and extending longitudinally therethrough is an adjustment slot 36 which extends completely through surfaces 21 and 22 and has its end portion terminating slightly inwardly of foot end 23 and head end 28 respectively. A rectangular channel 37 is formed in surface 22 extending completely along and contiguous to slot 36 for completely receiving therein the rectangular head 38 of bolt 39 having a threaded shaft 40, the bolt head 38 adapted to be received in channel 37 with the shaft 40 extending outwardly through slot 36 and with the channel preventing rotation of the bolt while providing for the longitudinal adjustable movement of the bolt relative to the slot.

As regards the enlarged head portion 33, there is provided on the flat top surface 21 a pair of vertically protruding longitudinally extending parallel guide rails 42 which extend from shoulder 25 to a position terminating inwardly of front end 28 and with the rails extending parallel to inside flat edge 30 as well as parallel to slot 36. An opening 43 is disposed between rails 42 slightly inwardly of the leading ends thereof, the opening passing completely through bar member 11 between surfaces 21 and 22 and terminating in an enlarged rectangular recess 44 defined in flat bottom surface 22. A bolt 45 having a square head 46 of a size to be snugly received in opening 44 is provided with the shaft 47 of the bolt extending through opening 43 and projecting vertically outwardly of bar member 11 adapted to be received in connecting link member 12 in a manner as will be later described.

A pair of notches 48 and 49 are provided in top and bottom surfaces 21 and 22 respectively of bar member 11 and defined in the front end 28 thereof and spaced approximately centrally thereof, the notches being in the form of a truncated triangular configuration adapted for use with an associated angle block member 13 as will be later described.

The connecting link member 12 consists of a flat horizontal top surface 51, a flat horizontal bottom surface 52, opposed parallel longitudinally extending flat inside and outside edges 53 and 54 respectively, a flat back end 55, and an angled front end 56 which extends from outside edge 54 in a direction inwardly and forwardly therefrom terminating at inside edge 53, the angle of inclination of leading edge 56 relative to outer edge 54 being substantially identical to the angle of inclination found between leading edge 28 relative to outer edge 26 of bar member 11. Provided in bottom surface 52 are a pair of transversely spaced apart longitudinally extending channel members 57 connecting with back end 58 and extending longitudinally forward therefrom to a position centrally of the connecting link member 12, the channels being of a size and configuration and spaced apart such as to slidably be received on guide rails 42 of bar member 11 when connecting link 12 is placed thereon such as illustrated in FIG. 2. Disposed between channels 57 is a longitudinally extending slot 58 extending completely through the connecting link between surfaces 51 and 52 and disposed to be in alignment with opening 43 of bar member 11 when the connecting link is placed thereon such that threaded shaft 47 of bolt 45 may extend through the slot 58 to be secured thereto by washer 59 and wing nut 60 for securing the connecting link member 12 in an adjustable manner to bar member 11.

Disposed forwardly of the channels 57 and in general longitudinal alignment therewith there are provided a pair of longitudinally extending slots 63 each going completely through the connecting link member between surfaces 51 and 52 and adapted to receive therethrough the shaft 40 of bolts 39 which are secured therein by means of washers 64 and wing nuts 65 respectively and in a manner as will be later described.

Figure 11:
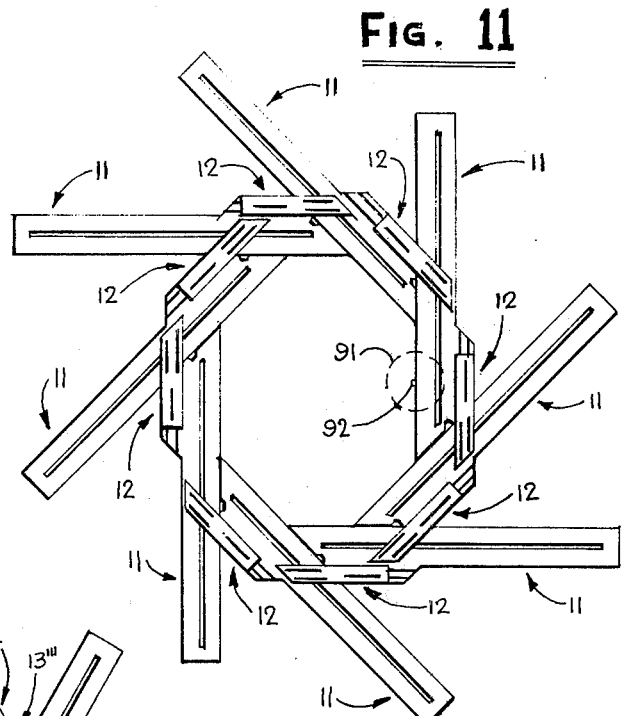
FIG. 11 is a top plan view of the bar members assembled to define an eight-sided template.
Figure 10:
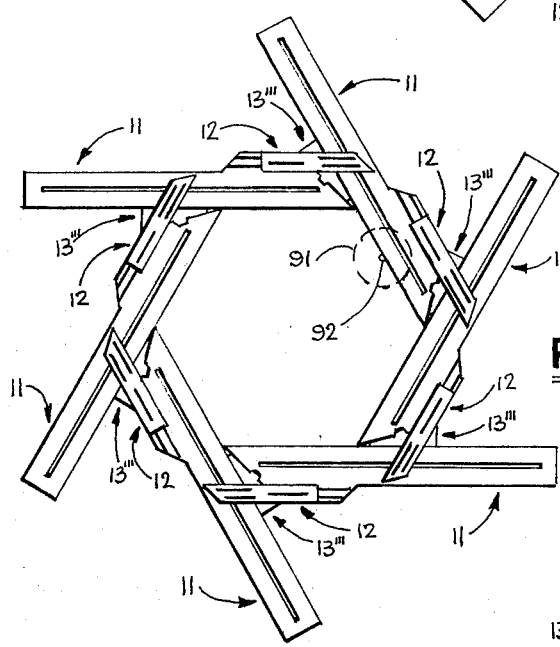
FIG. 10 is a top plan view of the bar members assembled to form a six-sided template.
Figure 5:
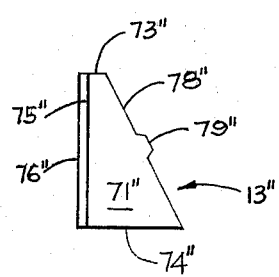
FIG. 5 is a top plan view of a 27° angle block.
Figure 9:
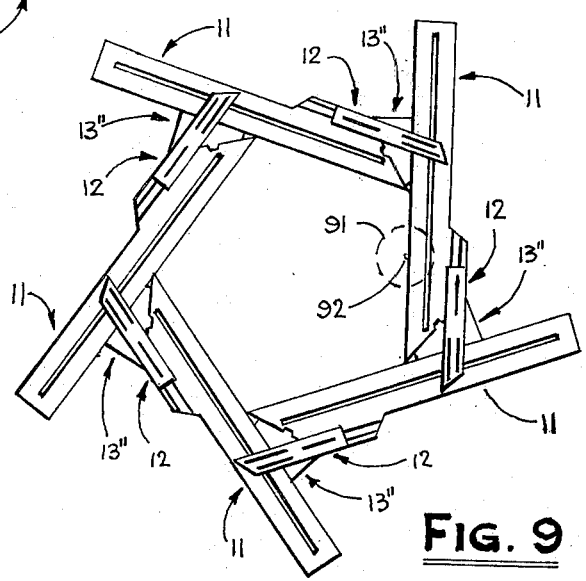
FIG. 9 is a top plan view of the bar members defining a five-sided template.

As seen in FIGS. 4, 5 and 6, the angle block members 13 may be provided at different angles to provide for different configurations of the assembly of the bar members 11 to each other, with preferred angles being shown of 45° by block member 13' in FIG. 4 and as utilized in the embodiment of FIG. 8, 27° by block member 13" in FIG. 5 as illustrated in the five-sided embodiment of FIG. 9, and 15° by block member 13''' in FIG. 6 as illustrated in the six-sided embodiment of FIG. 10. It is to be noted that FIG. 11 illustrates an eight-sided embodiment with no block members 13 being utilized. As all of the block members 13', 13", and 13''' are identical to each other except for the angle of inclination, reference is made to FIG. 7 where the details of the block members are disclosed in detail. Due to the similarity between the various block members, and in order to avoid needless repetition of description, similar reference numerals have been applied to the corresponding parts as between the disclosures of FIG. 7 and FIGS. 4, 5 and 6 with the use of single, double and triple prime marks respectively being utilized to designate the different disclosures thereof.

As seen in FIG. 7, each block member 13 consists of a flat horizontal top surface 71, a flat horizontal bottom surface 72, a truncated apex end 73, a flat base bottom end 74, a side edge 75 extending at a right-angle to base 74 and having a flat rectangularly shaped tongue 76 extending therealong and projecting outwardly therefrom, a sloping side edge 77 extending at the desired angle relative to the right angle side edge and provided with a channel 78 extending centrally thereof and completely therealong, and a pair of outwardly extending truncated triangularly shaped protrusions 79 and 80 disposed centrally of side edge 77 and adapted to be received in notches 48 and 49 respectively when the block 13 is assembled to the bar member 11. The tongue 76 is of a size and dimension to be slidably received in bar member channel 31, with channel 78 being of a size and dimension to slidably receive therein tongue 35 of bar member 11.

In operation, a connecting link member 12 is first assembled to one of the bar members 11 by engaging link member guide channels 57 with bar member guide rails 42 and securing the link member to the bar member by bolt 45 passing through opening 43 and aligned adjusting slot 58 to be secured by wing nut 60. The link member 12 is now longitudinally slidable on bar member 11 relative to bolt 45 for extending front end 56 forwardly or rearwardly of bar member leading edge 28. Depending on the desired configuration of the template, a set of angled block members 13 is selected which, for ease of description, will be taken for identification purposes as the 45° block member 13' as utilized in FIG. 8 and illustrated in FIG. 4. Bar member tongue 35 is received in channel 78' of side edge 77' with indexing protrusions 79' and 80' received in notches 48 and 49 respectively to thus secure and position block member 13' onto bar member 11 with the block member top and bottom surfaces 71' and 72' lying co-planar with bar member top and bottom surfaces 21 and 22 respectively.

The now assembled bar member, block member and connecting link member are placed adjacent to a similarly assembled set of bar member, block member, and connecting link member, such as illustrated in FIGS. 1 and 8, with the right angle side edge of block member 13' engaging inside flat edge 30 of the adjacent bar member and with the block tongue 76' being slidably engaged in the adjacent channel 31. The connecting link member 12 is now extended outwardly from its bottom member 11 to overlap the associated block member 13' until slots 63 intersect the plane of the adjusting slot 36 of the associated bar member 11. Bolts 39 are then inserted through the adjusting slot 36 of the adjacent bar member 11 to project upwardly therefrom and be received in the slots 63 of the connecting link 12 where they are secured in position by wing nuts 65.

It is now seen that one set of bar member, connecting link and block member is adjustably connected to the adjacent bar member, and that by completing such assembly the rectangular configuration illustrated in FIG. 8 is realized. By use of the bolts 39 and wing nut 65, the rectangular configuration of FIG. 8 may be increased or decreased in overall dimensions from a zero position having no space between the inside edges 30 of the respective bar member 11, to a maximum position, or to any position therebetween. To assist in the setting of the desired position, there is provided on the top surface 21 of each of the bar members 11 extending along inside edge 30 a series of calibrations or calibration marks 85 which preferably are spaced at one-quarter inch intervals completely therealong so that the apex junction 29 of one of the bar members 11 may be readily set at a desired calibration mark on an adjacent one of the bar members, such as illustrated in FIG. 1.

To form a five-sided template, the angle block member 13" of FIG. 5 is used in place of the previously described angle block member 13' of FIG. 4 with the resultant assembled template being that as illustrated in FIG. 9. Adjustment in operation is the same as previously described.

Similarly, replacing the angle block 13' member of FIG. 4 with the angle block member 13''' of FIG. 6, there is derived the six-sided template configuration of FIG. 10 which is assembled in the same manner as previously described and which is adjustable in the same previously described manner.

Lastly, referring to FIG. 11, there is illustrated an eight-sided configuration provided by use of the bar members and connecting link members alone and with the block members 13 having been completely eliminated.

In this regard, it is to be appreciated that block members of an infinite variety of angles are envisioned within the scope of the present invention to provide for a wide variety of possible template configurations depending on the desired usage of the craftsman utilizing the template.

As all of the bar members 11 and connecting link members 12 are identically constructed, along with the desired set of angle block members 13 also being identically constructed relative to each other, it is to be understood that the assembly of the template is simple and readily accomplished in that any of the bar members will accept any of the other bar members along with any of the connecting link members and any of the block members to be slidingly affixed thereto. In this regard, it is important to note that, when assembled, the adjustable routing template as defined by the assembled bar members, connecting link members, and block members provides a flat co-planar bottom surface defined by the individual bottom surfaces 22 of the individual bar members 11 and the individual bottom surfaces 72 of the block members 13, and a flat co-planar top surface defined by the top surfaces 21 and 71 of the bar members and block members respectively. This is important to the present invention in that it provides a smooth co-planar bottom surface for the template to be securely rested on the work piece, such as a cabinet door, with all portions of the bar members and block members forming the template being in contact with the work piece to provide a firm support to the template and eliminates any possible flexing of the template to assure for an even depth of routing on the work piece. Further, the flat top surface provides for the accurate positioning of the router thereon, such as designated generally in the drawings by reference numeral 91 and having its guide or reference spindle or bushing and bit 92 disposed adjacent inside flat edge 30. Thus, the router 91 moves freely about the inside edges 30 of the template while resting securely on the top surfaces 21 and 71 as it is guided thereabout.

Further, in this regard, it is to be noted that the offset of the connecting link members 12 relative to the bar members 11 along with the adjusting bolts and lock nuts and wing nuts associated therewith, are spaced a distance outwardly from the inside edges 30 to permit the router 71 to be freely guided by the inside edges 30 without encountering any interference from the connecting link members 12 or the associated bolts or nuts as the router is guided by the inside edges in its path around the routing template.

There is thus provided a novel infinitely adjustable routing template which is fully adjustable to an infinite variety of configurations, which securely rests on the work piece being routed, and which is readily and simply adjustable for providing a variety of designs to be routed into the work piece without having to manufacture a custom template for each design to be routed.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what I claim is:

1. An adjustable routing template for use in guiding a cutting tool, such as router, for the routing of grooves, recesses, ledges, steps and the like in a work piece, such as a cabinet door, the template comprising, in combination:
    a plurality of substantially identically constructed longitudinally elongated rigid bar members;
    a plurality of substantially identically constructed longitudinally elongated rigid connecting link members;
    there being at least one connecting link member for each bar member;
    a plurality of block members, there being at least one block member for each one of said bar members, each block member being detachably held between adjacent bar members in a position adjacent the associated link member;
    means connecting each of said link members to their associated bar member;
    means adjustably connecting each of said link members to an associated adjacent one of said bar members for adjustably slidably interconnecting each link member to the associated adjacent bar member to permit longitudinal adjustment of the bar member with respect to the link member;
    each of said bar members comprising, in combination:
        a flat horizontal top surface;
        a flat horizontal bottom surface;
        a flat vertically extending foot end;
        a flat vertically extending inside edge;
        a flat vertically extending front end extending outwardly and rearwardly from the inside flat edge;
        a flat outer edge having one end joined to the front end and extending rearwardly therefrom parallel to said inside edge;
        a further outer edge extending forwardly from said foot end parallel to said inside edge;
        a tapered shoulder outside edge interconnecting said first and said second mentioned outer edges;
        an adjustment slot extending longitudinally through said top surface terminating inwardly of said foot end and said front end thereof and in communication with said flat bottom surface;
        a longitudinally extending channel disposed in said inside flat edge and extending completely between the foot end and the front end thereof;
        a flat tongue member extending along said front end and projecting horizontally outwardly therefrom;
        a pair of transversely spaced apart longitudinally extending parallelly disposed guide rails affixed to said top surface and extending parallel to said inside flat edge, said guide rail disposed on said flat top surface on the opposite side of said adjustment slot from said inside flat edge; and
        an opening disposed intermediate said guide rails extending through said top and bottom surfaces.

2. The adjustable routing template as set forth in claim 1 wherein each of said bar members further comprises, in combination:
    a longitudinally extending channel formed in said flat bottom surface contiguous to said adjustment slot and extending completely therealong, said channel being of a rectangular cross-sectional configuration; and
    a rectangular recess formed in said flat bottom surface in communication with said opening.

3. The adjustable routing template as set forth in claim 2 wherein each of said connecting link members comprises, in combination:
    a flat horizontal top surface;
    a flat horizontal bottom surface;
    opposed flat longitudinally extending inner and outer side edges;
    a flat back end;
    a front end extending from said inner edge outwardly and rearwardly therefrom terminating at said outer edge;
    a pair of transversely spaced apart longitudinally extending channels formed in said bottom surface extending from said back end to a position in the central portion of said bottom surface, said channels being of a size and configuration to be slidingly received on said bar member guide rails when said connecting link member is affixed thereto;

an adjustment slot disposed intermediate said guide channels and extending longitudinally therebetween, said adjustment slot being disposed to be oriented with said bar member opening intermediate said guide rails when said connecting link member is affixed to said bar member;

a pair of transversely spaced apart longitudinally extending adjustment slots disposed in the forward portion of said connecting link member and extending completely therethrough.

4. The adjustable routing template as set forth in claim 3 wherein said means for slidably adjustably connecting said connecting link member to said bar member comprises, in combination:

a first bolt member having a rectangular head adapted to be received in said rectangular recess associated with said bar member opening with said bolt shaft extending outwardly of said opening and upwardly therefrom to be received in the rearward adjustment slot of said connecting link member and secured thereto by a wing nut; and a pair of bolt members each having flat rectangular heads adapted to be received in said bar member rectangular channel with said bolts extending outwardly of said bar member adjustment slot to be received in said forward located adjustment slots of said connecting link member for affixing said connecting link member to the adjacentmost one of said bar members.

5. The adjustable routing template as set forth in claim 4 wherein each of said block members comprising, in combination:

a substantially triangular shaped body member having a flat horizontal top surface, a flat horizontal bottom surface, a truncated apex top end, a flat bottom end, a side edge extending at a right-angle to said bottom edge, and a side edge extending at an angle less than ninety degrees to said bottom edge;

a flat tongue member extending along said right-angle side edge and projecting horizontally outwardly therefrom of a size and configuration to be received in the channel of the inside flat edge of an associated one of said bar members;

a channel extending completely through said angle side edge from said bottom end to said top end thereof, such channel being of a size and configuration to slidably receive therein said tongue of an associated one of said bar members;

whereby said block member is connected by its channel to said tongue on the front end of an associated one of said bar members with said block tongue adapted to be slidably received in an associated channeled inside side edge of an adjacentmost bar member.

6. The adjustable routing template as set forth in claim 5 further characterized by:

a pair of spaced apart vertically aligned notches formed centrally of said bar member front end in said top and bottom surfaces thereof and opening outwardly therefrom;

a pair of complementary shaped vertically spaced apart horizontally projecting protrusions formed on said angled edge of said block member and projecting outwardly therefrom; and said block member protrusions adapted to be detachably engaged with said bar member notches for positioning said block member on said bar member in a manner preventing any relative sliding movement therebetween.

7. The adjustable routing template as set forth in claim 6 wherein said front end of said connecting link member is disposed at an angle of 45° with respect to said inner edge, and wherein said front end of said bar member is disposed at an angle of 45° with respect to said inside flat edge.

8. The adjustable routing template as set forth in claim 7 further characterized by said top surfaces of said bar members and said block members lying co-planar with each other when assembled into said template; and wherein the bottom surface of each of said bar members lies co-planar with each other parallel to said top surfaces to define a smooth completely flat surface readily rested on a work piece to be routed.

* * * * *